United States Patent
Kim et al.

(10) Patent No.: US 8,495,013 B2
(45) Date of Patent: Jul. 23, 2013

(54) DISTRIBUTED STORAGE SYSTEM AND METHOD FOR STORING OBJECTS BASED ON LOCATIONS

(75) Inventors: Mi-Jeom Kim, Gyeonggi-do (KR); Chang-Sik Park, Seoul (KR); Eo-Hyung Lee, Gyeonggi-do (KR); Jin-Kyung Hwang, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 57 days.

(21) Appl. No.: 13/336,074

(22) Filed: Dec. 23, 2011

(65) Prior Publication Data

US 2012/0166394 A1 Jun. 28, 2012

(30) Foreign Application Priority Data

Dec. 24, 2010 (KR) .................. 10-2010-0134840

(51) Int. Cl.
*G06F 7/00* (2006.01)

(52) U.S. Cl.
USPC .......... 707/610; 707/615; 707/623; 707/661; 711/154

(58) Field of Classification Search
None
See application file for complete search history.

(56) References Cited

U.S. PATENT DOCUMENTS

| | | | |
|---|---|---|---|
| 4,714,992 A * | 12/1987 | Gladney et al. ................ | 1/1 |
| 5,315,601 A | 5/1994 | Lee et al. | |
| 6,587,950 B1 * | 7/2003 | Shah et al. ................... | 713/300 |
| 6,901,510 B1 * | 5/2005 | Srivastava ................... | 713/163 |
| 7,191,217 B2 * | 3/2007 | Tanabe et al. ................ | 709/205 |
| 7,650,328 B2 | 1/2010 | Hori et al. | |
| 7,739,233 B1 | 6/2010 | Ghemawat et al. | |
| 7,747,663 B2 * | 6/2010 | Atkin et al. .................... | 707/822 |
| 7,823,009 B1 * | 10/2010 | Tormasov et al. ........... | 714/6.12 |
| 7,853,770 B2 | 12/2010 | Tajima et al. | |
| 8,103,636 B2 | 1/2012 | Lee et al. | |
| 8,261,033 B1 * | 9/2012 | Slik et al. ...................... | 711/162 |
| 8,305,932 B2 * | 11/2012 | Qiu et al. ...................... | 370/254 |
| 8,380,659 B2 * | 2/2013 | Zunger ........................ | 707/609 |
| 2004/0064633 A1 | 4/2004 | Oota | |
| 2005/0125456 A1 | 6/2005 | Hara et al. | |
| 2005/0256923 A1 | 11/2005 | Adachi | |
| 2006/0047751 A1 | 3/2006 | Chen et al. | |
| 2006/0069828 A1 | 3/2006 | Goldsmith | |

(Continued)

FOREIGN PATENT DOCUMENTS

EP 2557892 A1 * 2/2013
JP 2008-059438 A 3/2008

(Continued)

OTHER PUBLICATIONS

"Parity Redundancy in a Clustered Storage System", Narayan et al., Internet Engineering Task Force, Dec. 1997.*

*Primary Examiner* — Fred I Ehichioya
*Assistant Examiner* — Hasanul Mobin
(74) *Attorney, Agent, or Firm* — IP Legal Services, LLC

(57) ABSTRACT

A distributed storage system and a method for storing objects based on locations. The distributed storage system may include a plurality of data nodes, at least one selection agent, a client, and a proxy server. The plurality of data nodes may be configured to be grouped into a plurality of zone groups based on locations of the plurality of data nodes and configured to store a target object and replicas of the target object. The at least one selection agent may be configured to select multiple target zone groups and select one target data node for each one of the selected multiple target zone groups.

18 Claims, 6 Drawing Sheets

U.S. PATENT DOCUMENTS

| | | |
|---|---|---|
| 2007/0079082 A1* | 4/2007 | Gladwin et al. ............... 711/154 |
| 2007/0300220 A1 | 12/2007 | Seliger et al. |
| 2008/0021935 A1 | 1/2008 | Geelen et al. |
| 2008/0317068 A1 | 12/2008 | Sagar et al. |
| 2009/0144422 A1* | 6/2009 | Chatley et al. ................ 709/226 |
| 2009/0144579 A1 | 6/2009 | Swanson |
| 2010/0058341 A1 | 3/2010 | Jung et al. |
| 2010/0076933 A1 | 3/2010 | Hamilton et al. |
| 2010/0161759 A1 | 6/2010 | Brand |
| 2010/0274762 A1* | 10/2010 | Murphy et al. ............... 707/636 |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0202741 A1 | 8/2011 | Tajima et al. |
| 2011/0301998 A1* | 12/2011 | Talwar et al. ................. 705/7.26 |

FOREIGN PATENT DOCUMENTS

| | | |
|---|---|---|
| KR | 10-1993-0007928 B1 | 8/1993 |
| KR | 10-1993-0023826 A | 12/1993 |
| KR | 10-2001-0091593 A | 10/2001 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0060304 A | 6/2010 |
| KR | 10-2010-0060715 A | 6/2010 |
| KR | 10-2010-0069234 A | 6/2010 |
| KR | 10-2010-0073154 A | 7/2010 |
| KR | 10-2010-0092850 A | 8/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |

* cited by examiner

FIG. 3

|  | Storage process | | Zone group change process | |
| --- | --- | --- | --- | --- |
|  | Selection of zone group | Selection of target data node | Selection of zone group | Selection of target data node |
| Algorithm 1 | Client | Client | Client | Client |
| Algorithm 2 | Client | Proxy server | Client | Proxy server |
| Algorithm 3 | Location-aware server (Proxy server) | Location-aware server (Proxy server) | | |

US 8,495,013 B2

DISTRIBUTED STORAGE SYSTEM AND METHOD FOR STORING OBJECTS BASED ON LOCATIONS

CROSS REFERENCE TO PRIOR APPLICATIONS

The present application claims priority under 35 U.S.C. §119 to Korean Patent Application No. 10-2010-0134840 (filed on Dec. 24, 2010), which is hereby incorporated by reference in its entirety.

FIELD OF THE INVENTION

Apparatuses and methods consistent with embodiments relate to a distributed storage system for efficiently and distributively storing an object and replicas of thereof in a plurality of data nodes distributed over a network. More particularly, apparatuses and methods consistent relate to a distributed storage system for storing an object and replicas thereof in data nodes selected based on locations of a client and a data node.

BACKGROUND OF THE INVENTION

Cloud computing may be referred to as a service that provides various information technology (IT) resources distributed over the Internet. The most common cloud computing service models may include Infrastructure as a Service (IaaS), Platform as a Service (PaaS), and Software as a Service (SaaS). The IaaS may provide hardware infrastructure as a service. The PaaS may provide application development and execution platform as a service. The SaaS may provide applications as a service.

The IaaS may further include many sub_service categories. Mainly, the IaaS may include a storage service and a computing service, which provide computing resources in a form of a virtual machine. Such a storage service may be provided by a distributed storage system. The distributed storage system may virtually create a storage pool using low-profiled hardware distributed over a network. Such a distributed storage system may dynamically and flexibly provide a shared storage space to users according to abruptly varying service demands. The distributed storage system may commonly employ an object-based storage scheme. The object-based storage scheme may be a typical cloud storage service scheme. The object-based storage scheme may allow each physical storage device to manage own storage spaces. The object-based storage scheme may improve overall performance of the distributed storage system and allow the distributed storage system to easily expand storage capability. Furthermore, data may be safely shared independently from related platforms.

The typical distributed storage system may include a plurality of object-based storages. The typical distributed storage system may replicate data and store replicated data in at least one object-based storage for data safety and high data availability. The replicated data may be referred to as a replica. The distributed storage system may generally have two or three replicas, but may have more than three replicas, depending on importance of a respective object. The distributed storage system may be required to synchronize the replicas of a respective object. Such synchronization may be processed by an independent replication server (not shown).

The typical distributed storage system may store and replicate objects regardless of physical locations of a client and a data node. As a result, a client might upload and download objects a data node separated from the client at a long distance. In this case, it causes a great delay for processing respective objects. For example, it may take a comparatively longer time to input and/or output the respective objects.

In addition, since the locations of clients and data nodes are not considered, a client may store an object and replicas thereof at a plurality of data nodes gathered in one specific zone. When a respective network of the specific zone fails, the data nodes in the specific zone may malfunction. In this case, clients may not use objects stored in the data nodes located in the specific zone. Therefore, there is a need for developing a method for selecting data nodes based on locations of a client and the data nodes and storing a target object and replicas thereof distributively in the selected data nodes.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In embodiments, a distributed storage system may store an object and replicas thereof in data nodes based on locations of the object and replicas and the data nodes. In embodiments, a distributed storage system may efficiently store and manage replicas based on locations of clients and data nodes.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 3 is a table that shows algorithms for selecting target zone groups and target data nodes, in accordance with embodiments;

DETAILED DESCRIPTION OF THE INVENTION

Figure 1:
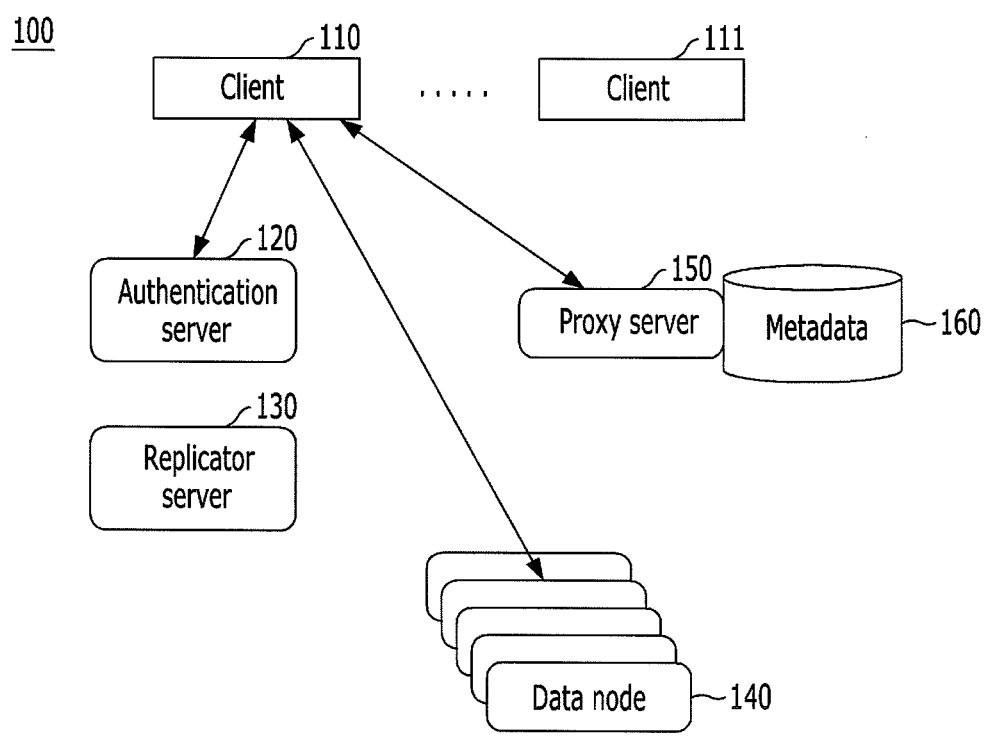
FIG. 1 illustrates a typical distributed storage system.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a typical distributed storage system. Referring to FIG. 1, a typical distributed storage system 100 may include a plurality of clients 110 and 111, an authentication server 120, a replicator server 130, a plurality of data nodes 140, a proxy server 150, and/or a metadata database 160.

The authentication server 120 may authenticate the plurality of clients 110 and 111 accessing the typical distributed storage system 100. The proxy server 150 may be referred to as a master server. The proxy server 150 may process various requests from the clients 110 and 111. The metadata database 160 may store and maintain metadata. The metadata may include information on physical locations of objects. The plurality of data nodes 140 may store and manage actual objects. The replicator server 130 may manage object replication.

At an initial stage, the clients 110 and 111 are authenticated through the authentication server 120. After the authentication process is completed, the clients 110 and 111 may request the proxy server 150 to send information on the data nodes 140 that store and manage desired objects. The proxy server 150 may request a respective data node 140 to perform a desired operation based on the metadata in response to a request from the clients 110 and 111. The data node 140 may transmit an ID and an address of the data node 140 to the clients 110 and 111 through the proxy server 150.

The clients 110 and 111 may directly communicate with the data node 140, without passing through the proxy server 150. The clients 110 and 111 may request the data node 140 to store and search objects. Since control channels and data channels are separated, delay or data traffic may be reduced.

The typical distributed storage system, however, may store and replicate objects regardless of physical locations of a client and a data node. As a result, a client might upload and download objects a data node separated from the client at a long distance. In this case, it causes a great delay for processing respective objects. Furthermore, since the locations of clients and data nodes are not considered, a client may store an object and replicas thereof at a plurality of data nodes gathered in one specific zone. When a respective network of the specific zone fails, the data nodes in the specific zone may malfunction. In this case, clients may not use desired objects stored in the data nodes located in the specific zone.

In order to overcome such disadvantages of a typical distributed storage system, a target object and replicas thereof are stored in data nodes selected based on locations of the data nodes and respective clients, in accordance with embodiments. Hereinafter, a distributed storage system and a method for storing an object and replicas thereof in accordance with embodiments will be described with reference to FIG. 2 to FIG. 6.

Figure 2:
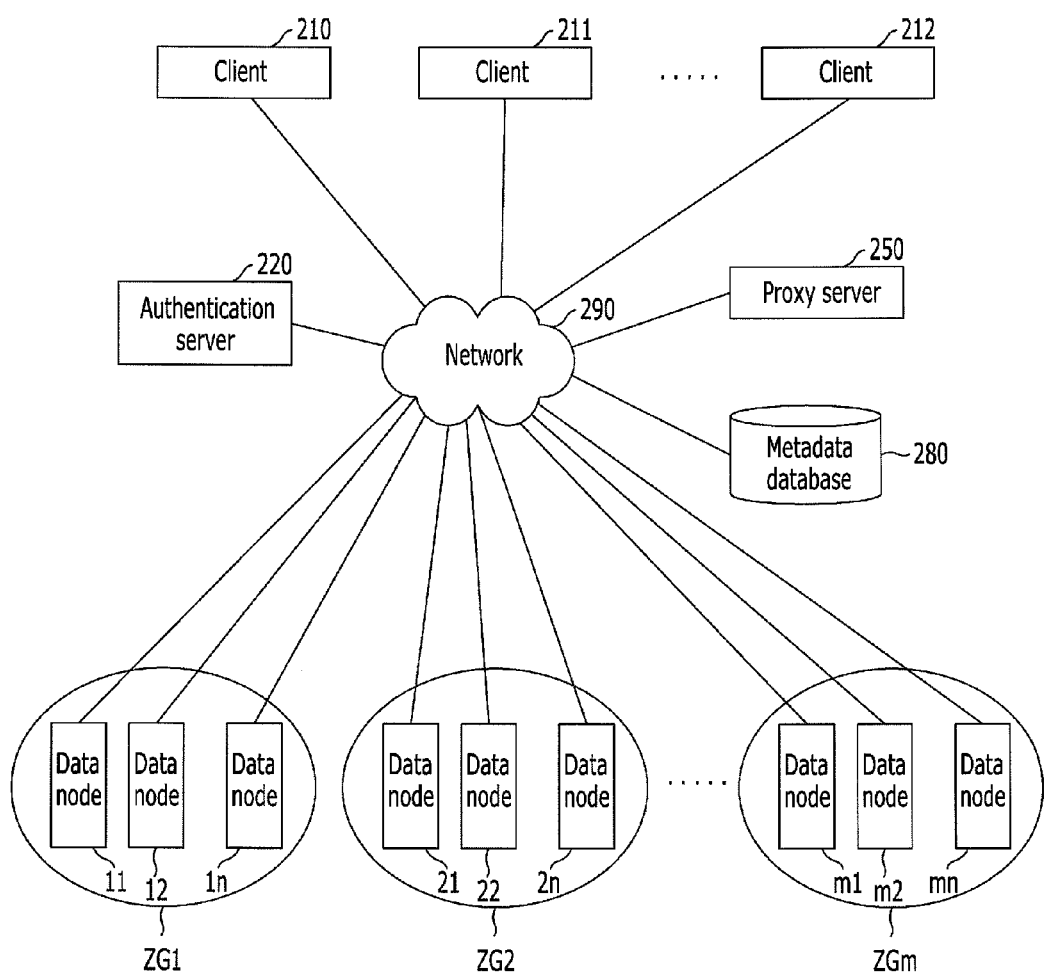
FIG. 2 illustrates a distributed storage system in accordance with embodiments.

FIG. 2 illustrates a distributed storage system in accordance with embodiments. Referring to FIG. 2, distributed storage system 200 in accordance with embodiments may include plurality of clients 210 to 212 and plurality of data nodes 11 to 1n, 21 to 2n, and m1 to mn. Plurality of clients 210 to 212 and plurality of data nodes 11 to mn may be coupled through network 290. Each one of plurality of clients 210 to 212 may denote a user equipment accessing distributed storage system 200. The distributed storage system 200 may further include authentication server 220, proxy server 250, and metadata database 280.

Data nodes 11 to 1n, 21 to 2n, and m1 to mn may be grouped by a zone in accordance with embodiments. Distributed storage system 200 may group plurality of data nodes 11 to 1n, 21 to 2n, and m1 to mn based on locations thereof. As shown in FIG. 2, distributed storage system 200 may group the plurality of data nodes 11 to 1n, 21 to 2n, and m1 to mn into three zone groups ZG1, ZG2 and ZGm. Each zone group may include data nodes located in a specific zone. Particularly, data nodes 11 to 1n may be included in first zone group ZG1, data nodes 21 to 2n may be included in second zone group ZG2, and data nodes m1 to mn may be included in $m^{th}$ zone group ZGm, respectively. Since plurality of data nodes 11 to 1n, 21 to 2n, and m1 to mn are grouped based on locations thereof, distributed storage system 200 may effectively store an object and replicas thereof in data nodes 11 to mn distributed over a network.

Distributed storage system 200 may not store an object and replicas thereof in data nodes belonging to the same zone group, in accordance with embodiments. Particularly, distributed storage system 200 may not store identical objects in more than one data node belonging to the same zone group. For example, distributed storage system 200 may store an object in a data node of a first zone group and store replicas of the object in data nodes in zone groups different from the first zone group. Furthermore, distributed storage system 200 may not store replicas of the same object in data nodes belonging to the same zone group. Accordingly, each one of the replicas of an object may be stored in one data node of different zone groups, in accordance with embodiments.

Metadata may include information on physical locations of an object and replicas thereof. Particularly, the metadata may include information on mapping relation of objects including replicas thereof and corresponding data nodes that store the objects.

The above described manner of storing an object and replicas thereof may increase data reliability because replicas of one object are distributively stored in data nodes in different zone groups, in accordance with embodiments. For example, when a replica in one zone group is damaged due to errors of a respective network a user can retrieve other replica stored in a data node in a different zone group.

In accordance with embodiments, a zone group may be a single data center or a single server rack, but embodiments are not limited thereto. After a plurality of data nodes are grouped by each zone group, mapping relation between a data node and a corresponding zone group may be updated in a metadata. After updating the metadata, replicas of one object may be replicated in respective data nodes in different zone groups.

Grouping the data nodes into the zone groups may have the following advantages in accordance with embodiment. In embodiments, clients 210, 211 and 212 and data nodes 11 to 1n, 21 to 2n, and m1 to mn may communicate with each other over network 290. That is, virtual channels may be established between clients 210, 211 and 212 and respective data nodes 11 to 1n, 21 to 2n, and m1 to mn. However, the virtual channels does not always have the same conditions with respect to pairs of one of clients 210, 211 and 212 and one of data nodes 11 to 1n, 21 to 2n, and m1 to mn. For example, conditions of such a virtual channel may be dynamically changed according to various factors including physical distances between a client and a corresponding data node. For example, as the physical distance between a client and a corresponding data node becomes farther, it may take a relatively longer time to transmit/receive a target object because the target object may be relayed through more nodes or gateways.

In addition, the conditions of the virtual channel may be changed according to an amount of network traffic, and/or performance of network resources configuring a respective virtual channel. As the amount of the network traffic over a respective virtual channel is comparatively great, it is highly likely that transmission collision will occur on the respective virtual channel. As the performance of the network resources is comparatively higher, the transmission/reception speed of the virtual channels may become faster.

In accordance with embodiments, a virtual channel between one of clients 210, 211 and 212 and respective one of data nodes 11 to 1n, 21 to 2n, and m1 to mn may be selected based on the above described conditions. In order to select the most optimal virtual channel, distributed storage system 200 may refer to the physical distance between clients 210, 211 and 212 and zone groups ZG1, ZG2 and ZGm. Therefore, an object upload time may be minimized by storing the object in the data node belonging to the zone group located at the shortest distance from the respective client having an object to be stored.

In accordance with embodiments, distributed storage system 200 does not store replicas of the same object in data nodes belonging to the same zone group. In this manner, replicas of the target object may be distributively stored over a plurality of zone groups. Accordingly, data availability and data reliability may be improved in accordance with embodiments. For example, a data center may be defined as one zone group including a plurality of data nodes. Such a data center may malfunction due to power failure. In this case, a user cannot access all data nodes belonging to the data center. Since the distributed storage system stores replicas distributively over a plurality of zone groups, for example, different data centers, a user may access a desired data stored in a different data center, in accordance with embodiments.

Referring to FIG. 2, distributed storage system 200 may select a data node by a manual selection scheme or an automatic selection scheme in accordance with embodiments. In the manual selection method, proxy server 250 may inquire of a client to select multiple suitable zone groups when the client initially creates an account for an object storage service.

The number of zone groups to select may be determined according to the number of replicas. Accordingly, the client may select zone groups as many as the number of replicas of a target object. Furthermore, the client may select zone groups according to priorities of zone groups. Since the client may want to store a different number of replicas according to a target object, the client may want to select as many zone groups as the maximum number of replicas to store. Thereafter, when the client wants to change zone groups to store the replicas, the client may request proxy server 250 to change the zone group. When proxy server 250 accepts the request from the client, proxy server 250 may store a replica in a target data node belonging to a changed suitable zone group.

Figure 6:
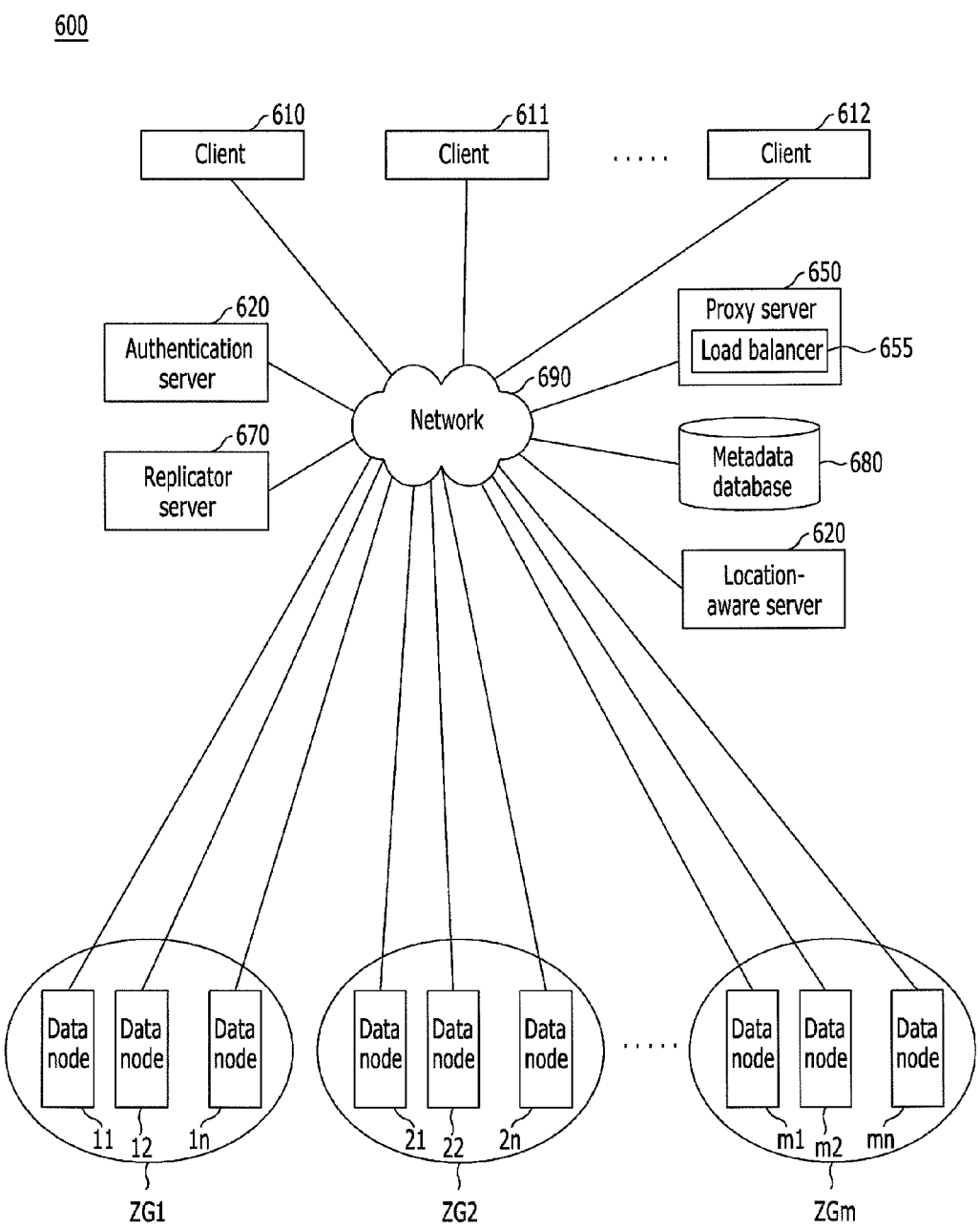
FIG. 6 illustrates a distributed storage system in accordance with embodiments.

In the automatic selection method, location-aware server 620 may automatically select a zone group may as show in FIG. 6, in accordance with embodiments. Embodiments relating to an automatic selection method will be described below in detail with reference to FIG. 6 below.

FIG. 3 is a table that shows algorithms for selecting target zone groups and target data nodes to store a target object and replicas thereof, in accordance with embodiments. In order to store a target object and replicas thereof in distributed storage system 200, multiple target zone groups and corresponding target data nodes may be selected. Such a selection process may be performed by one of a client, proxy server 250, and location-aware server 620 of FIG. 6. Hereinafter, algorithms for such as a selection process will be described. The algorithms may be classified by a main agent that mainly performs the selection process. The main agent may be referred to as a selection agent. For example, the main agent may be one of a client, proxy server 250, and location-aware server 620.

First Algorithm

In the first algorithm, a client may be a main agent for selecting target zone groups and target data nodes, in accordance with embodiments. Here, the client may denote a user equipment accessing distributed storage system 200 for the distributed storage service. The target zone groups may denote specific zone groups that a respective client wants to store a target object and replicas thereof in one of data nodes belonging to one of the specific zone groups. The target object may denote an object that a client wants to store, or that a client wants to search for from data nodes. The target data nodes may denote one storing the target object and the replicas thereof among a plurality of data nodes.

In the first algorithm, a client may select target zone groups and target data nodes and may assign priorities to the selected target zone groups. For example, the client may select multiple target zone groups from the plurality of zone groups based on locations thereof. Then, the client may select one data node from each one of the selected multiple target zone groups. Such selected data nodes may be referred to as target data nodes for storing a target object and replicas thereof.

The priorities may be determined based on a client preference of the selected target zone groups. Furthermore, the priorities may be determined based on the locations of the client and the zone groups and the data nodes, but the present invention is not limited thereto. Such priorities may denote a ranking of each data node or each zone group. The priorities may indicate a suitability level of a data node for storing a target object, as compared to other data node or other zone group.

The priorities may include a zone group priority and a data node priority. The zone group priority may denote a suitability level of a respective zone group for storing a target object, as compared to other zone group. The data node priority may denote a suitability level of a respective data node for storing a target object, as compared to other data node. Such priorities may be determined based on a client preference of a data node zone or a data node for a target object. Furthermore, the priorities may be determined automatically by the proxy server or the location-aware server. The priorities will be described in more detail later.

After the client selects the target zone groups and the target data nodes, the client may store the target object in one of the selected target data nodes and replicate the target object in the other target data nodes through a replication process. The replication process may be performed by a replication agent. The replication agent may be one of a client, a plurality of data nodes, and a proxy server. The replication agent and the replication process will be described in detail with reference to FIG. 5.

After the client selects the target data nodes, proxy server 250 may inquire of the client about a data node list of the target data nodes storing the target object and the replicas thereof. Proxy server 250 may update metadata database 280 using the data node list, which is received from the client in response to the inquiry of proxy server 250.

In the first algorithm, the client may be allowed to change the selected target zone groups and the selected target data nodes. In order to perform such a change process, the client may send a zone group change request to proxy server 250. When the proxy server 250 accepts the zone group change request, the proxy server 250 may delete a related data node list from metadata database 280. Then, the client may select new target zone groups and target data nodes to store the target object and the replicas thereof and select one of the selected target data nodes. In addition, the client may assign again priorities to the newly selected target zone groups and target data nodes. As described above, the priorities may be determined based on a client preference of the selected zone groups and/or the locations of the client and the zone groups and the data nodes thereof. Proxy server 250 may inquire of the client about the new data node list and may update the metadata database using the new data node list which is received from the client in response to the inquiry of the proxy server.

In accordance with embodiments, distributed storage system 200 may perform a management process. The management process may include a process of storing a target object in a target data node, a process of reading a stored target object from a target data node, a process of changing a zone group or a target data node storing a target object, and a process of modifying a stored target object. That is, the management operation may include all processes of distributively storing an object, reading the stored object, and modifying the read object. In addition, the distributed storage system may be substantially similar to a cloud storage system supporting could computing. The distributed storage system may refer to any type of systems that can store the same object in two or more storages to thereby prevent data loss and reduce burdens of storages.

In the first algorithm, since the client directly selects the target zone groups and the target data nodes, a target object may be preferentially stored in a suitable data node selected by a user. It may be an advantage of the first algorithm.

Second Algorithm

In the second algorithm, a client selects target zone groups and proxy server 250 selects target data nodes, in accordance with embodiments. A main concern of a client may be which zone group is regionally close from the location of the client. After selecting a zone group, it is not a major concern of the client which data node is selected from a plurality of data nodes belonging to the selected zone group. In particular, as the number of data nodes belonging to a zone group increases, it may be a unnecessary and annoying process for a client to select a target data node from each one of the selected multiple target zone groups. Therefore, once the client selects target zone groups, the proxy server 250 may automatically select a target data node from each one of the selected target zone groups.

Hereinafter, such a second algorithm will be described in more detail. At first, the client may select multiple zone groups from the plurality of zone groups and assign priorities to the selected multiple zone groups. The priorities may be determined based on a client preference of zone groups.

Proxy server 250 may then select one data node as a target data node from each one of the selected multiple zone groups. In embodiments, one target data node may be selected from data nodes belonging to each one of the selected multiple target zone groups. Proxy server 250 may transmit to the client a data node list including information on the selected target data nodes. Proxy server 250 may update the metadata database using the data node list.

The client may receive the data node list from proxy server 250 in accordance with embodiments. The data node list may include information on one target data node selected for each one of the multiple target zone groups selected by the client. The client may store a target object in one of the target data nodes and store replicas of the target object in the other target data nodes through perform a replication process. The replication process may be performed by a replication agent. The replication agent may be one of a client, a plurality of data nodes, and a proxy server. The replication agent and the replication process will be described in detail with reference to FIG. 5.

In order to select the target data nodes, proxy server 250 may consider available storage capacity and object storage history of data nodes belonging to the same zone group. That is, proxy server 250 may assign priorities to the data nodes included in the same zone group in consideration of the available storage capacity and the object storage history of the data nodes. Thereafter, proxy server 250 may determine a data node having the highest priority as a target data node.

In the second algorithm, even when the client changes a zone group, the client may not need to select target data nodes once the client selects target zone groups. Therefore, when proxy server 250 accepts a zone group change request, the client may select a new target zone group. The client may assign priorities to the selected target zone groups. Proxy server 250 may delete a previous data node list from metadata database 280. Proxy server 250 may select one data node as a target data node from each one of the selected target zone groups selected by the client. Proxy server 250 may transmit a new data node list including the selected new target data nodes. In addition, proxy server 250 may update metadata database 280 using the new data node list including information on the new selected target data nodes. The clients may receive the data node list of the new target data nodes from proxy server 250. In this case, the client may store a target object in a target data node belonging to a target zone group having the highest priority and store replicas in the other target data nodes in the data node list. Such a replication process may be performed through a replication agent. The replication process will be described in detail with reference to FIG. 5.

In the second algorithm, the client may be only required to select target zone groups unlike the first algorithm. Accordingly, the process of storing and replicating data may be advantageously performed quickly. In addition, the proxy server 250 may automatically select a data node having the highest priority among data nodes of the same zone group. Therefore, the loads of the data nodes may be effectively balanced.

Third algorithm

In the third algorithm, target zone groups and target data nodes may be automatically selected, in accordance with embodiments. Such an automatic selection process may be formed by at least one of proxy server 250 and location-aware server 620, in accordance with embodiments.

As described above, location-aware server 620 may be used to select target zone groups that may be close to the location of the client. Location-aware server 620 may be an independent device from proxy server 650 or 250 (see FIG. 2 and FIG. 6). Embodiments, however, are not limited thereto. For example, location-aware server 620 may be integrated with proxy server 650, in accordance with embodiments. In case of using location-aware server 620, location-aware server 620 may select target zone groups based on locations of the zone groups and the client, for example distances between zone groups and a respective client. Location-aware server 620 may determine priorities of the selected target zone groups, based on distances between the selected target zone groups and the client. Proxy server 250 or 650 may select one target data node from each one of the selected target group zones selected by location-aware server 620. Proxy server 250 or 650 may update metadata database 280 or 680 using the data node list of the selected target data nodes and the selected target zone group. When proxy server 250 or 650 transmits the data node list and the priorities of the target zone groups to the client, the client may store a target object in one of the target data nodes and perform a replication process to store replicas of the target object in other target data nodes.

In the third algorithm, since the target zone groups and the target object nodes are selected automatically, a target object may be stored in a respective data node more quickly than the first and second algorithms. Location-aware server 620 may dynamically select an optimal zone group in consideration of a time-varying network environment in real time. Since the client is not involved in the selecting process unlike the first and second algorithms, the zone group change process may not be required in the third algorithm. Embodiments, however, are not limited thereto. If necessary, the client may change the zone group and target data node that have been selected automatically. When the user wants to change the selected zone group, the client may select all zone group including new target data nodes to store a target object, and may select all target data nodes of the zone groups. In addition, the client may select the zone group and proxy server 250 or 650 may determine the target data node as described above.

Figure 4:
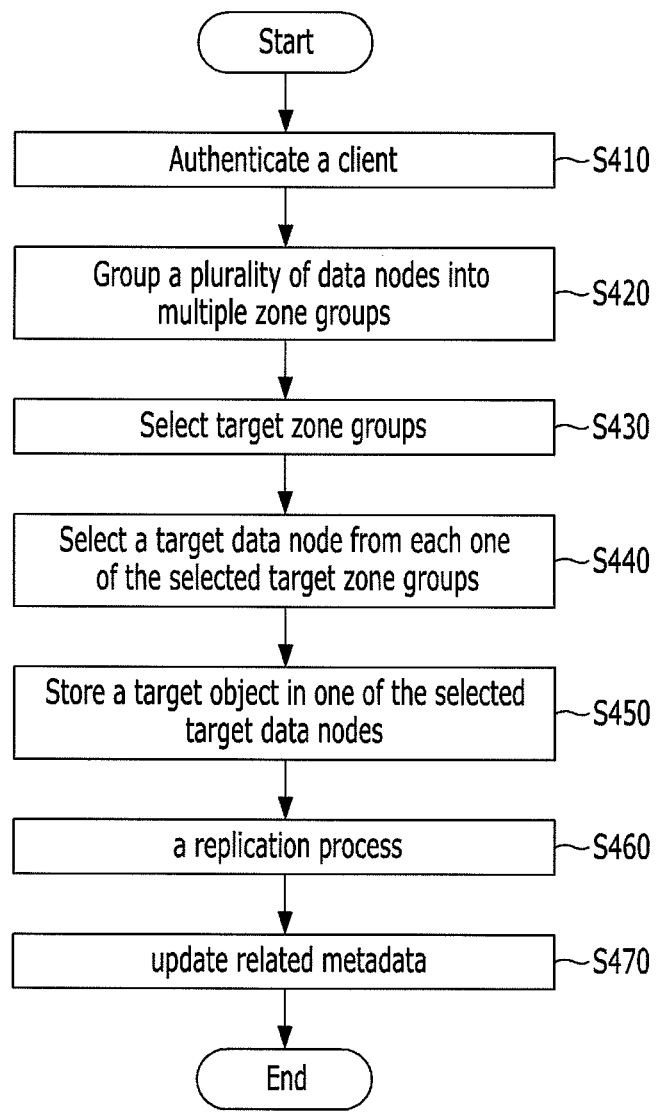
FIG. 4 illustrates an object storing method of a distributed storage system, in accordance with embodiments.

FIG. 4 illustrates an object storing method of a distributed storage system, in accordance with embodiments. An authentication process may be performed S410. For example, when client 210 initially accesses distributed storage system 200, authentication server 220 may authenticate the client.

Zone groups may be defined by grouping the regionally adjacent data nodes based on locations of data nodes S420. For example, distributed storage system 200 may group a plurality of data nodes into multiple zone groups based on locations of the data nodes. The number of multiple zone groups may be determined based on the number of replicas that a respective user wants to store.

Target zone groups may be selected S430, and a target data node may be selected from each one of the selected target zone groups S440. Accordingly, a plurality of target data nodes may be selected. For example, such a selection process may be performed by one of a client and proxy server 250. Furthermore, the selection process may be performed by both of the client and proxy server 250. For example, both the target zone groups and the target data nodes may be selected by the client. Alternatively, only the target zone groups may be selected by the client and the target data nodes may be selected by proxy server 250. In addition, the target zone groups and the target data nodes may be selected automatically by proxy server 250 and/or location-aware server 650.

After the target data nodes are selected, the target object may be stored and replicated in the selected target data nodes S450. For example, the client may store the target object in a data node belonging to a zone group having the highest priority. Then, one of a client, a data node, and a replicator server may perform a replication process of the target object. The replication process will be described later with reference to FIG. 5.

After the target object and the replicas are stored in the target data nodes, metadata may be updated S460. For example, proxy server 250 may update a respective metadata in metadata database 280 using unique information on the target object and the data nodes storing the target object and the replicas thereof. The updated metadata may be used to notify the target data nodes when the client searches for the stored target object.

In accordance with embodiments, the object storing method may further include a zone group change process that changes the selected zone groups. In order to perform the zone group change process, the client may send a zone group change request to proxy server 250. Proxy server 250 may determine whether to accept the zone group change request. When proxy server 250 accepts the zone group change request, proxy server 250 may delete the list of the target data nodes related to the stored target object from metadata database 280, in accordance with embodiments.

New target zone groups and target data nodes may be selected by one of the client and proxy server 250. For example, both the target zone groups and the target data nodes may be selected by the client. Alternatively, the target zone groups may be selected by the client, and the target data nodes may be selected by proxy server 250. In accordance with embodiments, both the target zone groups and the target data nodes may be selected automatically by proxy server 250 and/or location-aware server 620.

After the new target zone groups and the new target data nodes are selected, a process of storing and replicating the target object may be performed. Proxy server 250 may update metadata database 280 using the list of the new target zone groups and the new target data nodes.

In accordance with embodiments, the data node list may include information on the target object and information on the target data zone and the target data nodes. The information on the target object may include at least one of an ID, a size, a data type, and a creator of the object. The information on the target data zones and the target data nodes may include at least one of an ID, an Internet protocol (IP) address, and a physical location of the data node.

Below, replication process S450 in the object storing method, in accordance with embodiments, will be described in detail.

Figure 5:
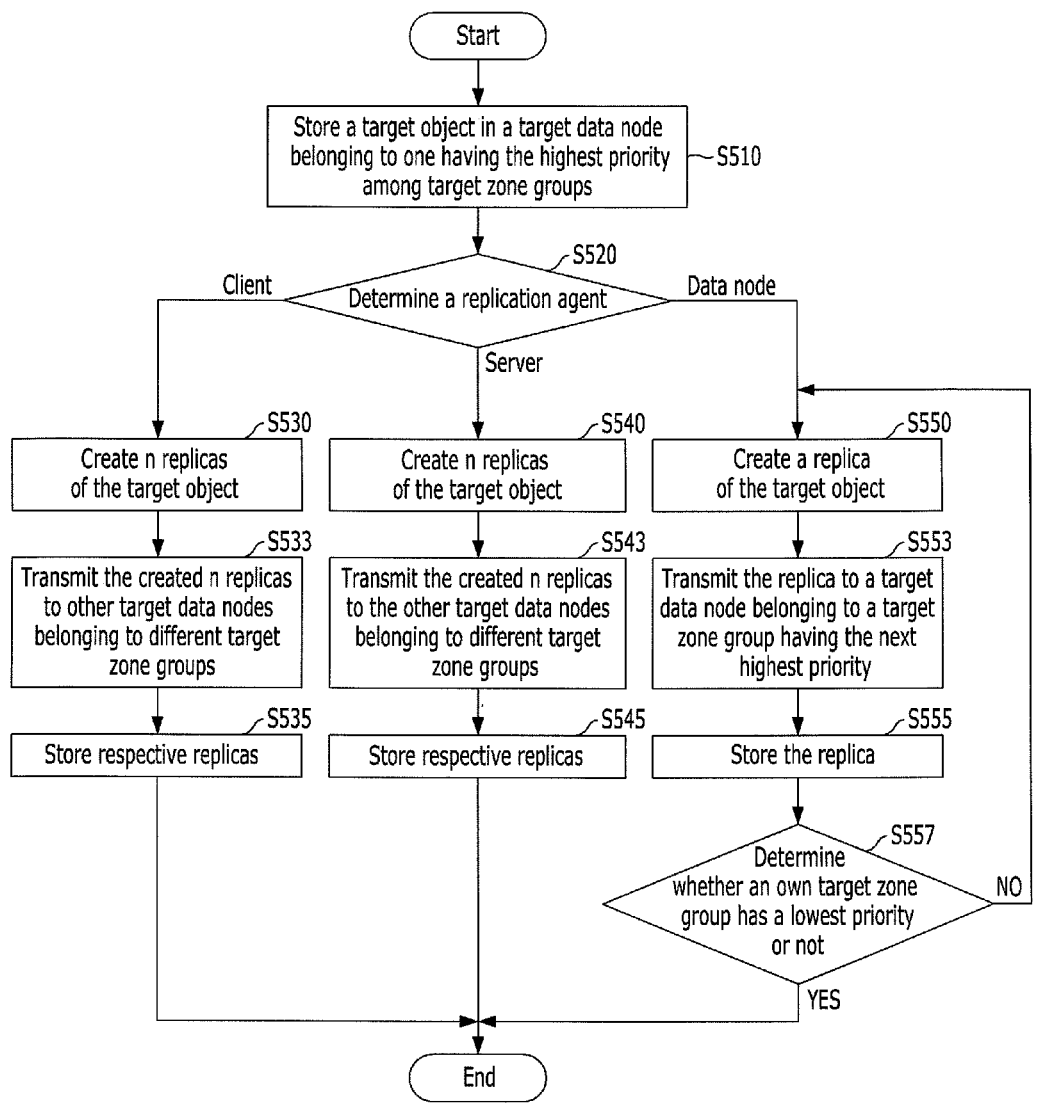
FIG. 5 illustrates a replication process in the object storing method of the distributed storage system in accordance with embodiments.

FIG. 5 illustrates a replication process in the object storing method of the distributed storage system in accordance with embodiments. After the target zone groups and the target data nodes are selected, a target object may be stored in one of the selected target data nodes, which is belonging to the target zone group having the highest priority 5510.

A replication agent for performing the replication process may be determined S520. In accordance with embodiments, one of a client, a data node, and a certain server may perform the replication process as a main agent. For example, the certain server may be one of proxy server 250 and replicator server 670 of FIG. 6. Furthermore, proxy server 250 may perform the replication process using replicator server 670.

When a client is selected as the replication agent (client—S520), the client may create n replicas of the target object S530 and transmit the n replicas to other target data nodes belonging to different target zone groups S533. Then, the transmitted replicas may be stored in respective target data nodes S535. In this case, n target data nodes may store n replicas in parallel. Accordingly, a transaction time may be reduced. However, a transmission bandwidth of the client may be excessively occupied because the client transmits the n replicas of the target object to the n target data nodes at the same time.

When a certain server is selected as the replication agent (server—S520), the certain server may create n replicas of the target object S540 and transmit the n replicas to other target data nodes belonging to different target zone groups S543. Then, the transmitted replicas may be stored in respective target data nodes S545. For example, the certain server may create n replicas of the target object and transmit the created n replicas to the other selected target data nodes. The certain server may be one of proxy server 250 and replicator server 670, in accordance with embodiments. Alternatively, the proxy server 250 may use the replicator server 670 to perform the replication process, in accordance with embodiments.

When a data node is selected as the replication agent (a data node—S520), the target data node of the target zone group having the highest priority may create a replica of the target object S550 and transmit the replica to a target data node belonging to a target zone group having the next highest priority S553. When the target data node transmits the replica, the target data node may also transmit the data node list including information on the target zone groups and the target data nodes. The replica may be stored in the target data node belonging to the target zone group having the next highest priority S555. Determination may be made as to whether or not a priority of the own target zone group is the lowest priority S557. When the priority of the respective zone group is not the lowest priority (No—S570), a replica of the target object may be created and transmitted to a target data node belonging to a target zone group having the next highest priority S550 and S553. Such a replication process, which is performed by a data node, may be a pipeline scheme. For example, the replicas of a target object may be transmitted to a plurality of respective data nodes belonging to different zone groups and stored in the plurality of respective data nodes belonging to different zone groups in parallel.

When the data node performs the replication process as described above, the replication process may be performed (n−1) times where n is the number of target data nodes to store a target object and replicas thereof. Therefore, time delay may occur in a total transaction. However, load and transmission traffic of the client may be considerably reduced, in accordance with embodiments.

FIG. 6 illustrates a distributed storage system, in accordance with embodiments. A distributed storage system 600, in accordance with embodiments, may include plurality of clients 610, 611 and 612 and plurality of data nodes 11 to 1n, 21 to 2n, and m1 to mn. Plurality of clients 610 to 612 and plurality of data nodes 11 to mn may be coupled through network 690. Distributed storage system 600 may further include authentication server 620, proxy server 650, location-aware server 620, replicator server 670, and metadata database 680. Clients 610, 611 and 612, authentication server 620, and metadata database 680 may have similar structures and functions as compared to those of distributed storage system 200 of FIG. 2.

Unlike distributed storage system 200 of FIG. 2, distributed storage system 600, in accordance with embodiments, may further include location-aware server 620. Location-aware server 620 may select target zone groups or target data nodes. An authenticated client may inquire of proxy server 650 about target data nodes to store a target object and replicas thereof. Proxy server 650 may request location-aware server 620 to select the most suitable zone groups as target zone groups.

In response to the request from proxy server 650, location-aware server 620 may select at least one zone group as the target zone group based on a basic replica policy of the client, in accordance with embodiments. The basic replica policy of the client may be the number of replicas of a respective target object that the client wants to have. For example, location-aware server 620 may select zone groups as many as the number of replicas of a target object that the client wants to store. Location-aware server 620 may transmit a list of the selected zone groups to proxy server 650. Location-aware server 620 may consider a plurality of factors to select the most suitable zone groups. For example, location-aware server 620 may refer to a physical location of the client to select the zone groups. Location-aware server 620 may determine the physical location of the client based on an IP address of the client, but embodiments are not limited thereto. Beside the physical location of the client, various factors may be considered to select the zone group. Location-aware server 620 may determine priorities of the selected zone groups based on a distance between the client and a respective zone group. Based on the priorities of the selected zone groups, the client may select one target data node belonging to a zone group having the highest priority and store the target object in the selected target data. Furthermore, the client may select at least one target data node belonging to zone groups having priorities lower than the highest priority and stores replicas of the target object in the selected target data nodes. FIG. 6 illustrates that location-aware server 660 is an independent device from proxy server 650. However, such a location-aware server 620 may be physically integrated with proxy server 650.

In accordance with embodiments, a target data node belonging to the selected zone group may be determined by one of proxy server 650 and location-aware server 620. When location-aware server 620 determines the target data node, location-aware server 620 may select the target data node regionally close to the client having the target object within the zone groups based on metadata database 680. Meanwhile, when proxy server 650 selects the target data node, proxy server 650 may use load balancer 655 to check states of the data nodes belonging to the zone groups. Proxy server 650 may select the data node having the optimal condition as the target data node. In FIG. 6, load balancer 655 is included in proxy server 650. However, embodiments are not limited thereto. Load balancer 655 may be an independent device from proxy server 650.

Proxy server 650 may manage information of the data nodes belonging to each zone group in the metadata. Proxy server 650 may previously determine priorities of the data nodes in consideration of storage capacities of the data nodes in order for load balancing among the data nodes. In response to the request from the client, the data node may be selected in consideration of the object storage history of the data nodes and the priorities of the data nodes. Accordingly, the load balancing among the data nodes within the zone group may be maintained.

In accordance with embodiments, the distributed storage system may efficiently provide a cloud storage service. In embodiments, the distributed storage system may detect a location of a client and store replicas of an object in a data node regionally close to the location of the client.

In accordance with embodiments, data nodes may be grouped into zone groups in order to efficiently provide a cloud storage service. In embodiments, replicas may be safely stored in the distributed data nodes in different zone groups. Accordingly, data reliability may be secured even though a problem occurs at one zone group.

In embodiments, replicas of an object may be stored distributively over a plurality of data nodes each belong to different zone groups. In embodiments, such a replication process may increase data availability and a storing and searching time delay may be minimized because a target object and replicas thereof are stored in data nodes physically close to a location of a client.

In accordance with embodiments, a distributed storage system may select target data nodes and store a target object and replicas thereof in the selected target data nodes based on locations of the target object and the target data nodes. The distributed storage system may include a plurality of data nodes, at least one selection agent, a client, and a proxy server. The plurality of data nodes may be configured to be grouped into a plurality of zone groups based on locations of the plurality of data nodes and configured to store a target object and replicas of the target object. The at least one selection agent may be configured to select multiple target zone groups and select one target data node for each one of the selected multiple target zone groups. The client may be configured to access the distributed storage system through a network, store the target object in one of the selected target data nodes and perform a replication process using a replication agent to store the replicas of the target object in other target data nodes. The proxy server may be configured to update a metadata database based on a data node list that includes information on the target zone groups and the target data nodes storing the target object and the replicas.

The at least one selection agent may be the client. In this case, the client may be configured to select the multiple target zone groups from the plurality of zone groups based on locations of the plurality of zone groups and the client in response to an inquiry from the proxy server, assign priorities to the selected multiple target zone groups and data nodes belonging to the selected multiple target zone groups, select the target data nodes by selecting one data node for each one of the selected multiple target zone groups based on the assigned priorities, store the target object in one of the target data nodes, store the replicas of the target object by performing the replication process using the replication agent, and transmit the data node list to the proxy server. Such priorities may be determined based on user preferences and locations of the zone groups and the data nodes. The target object may be stored in the target data node belonging to one of the target zone groups, which has a highest priority among the selected multiple zone groups.

The at least one selection agent may be the client and the proxy server. In this case, the client may be configured to select the multiple target zone groups from the plurality of zone groups based on locations of the plurality of zone groups in response to an inquiry from the proxy server, assign priorities to the selected multiple zone groups, receive a data node list from the proxy server, store the target object in one of the target data nodes included in the received list, store the replicas of the target object in other target data nodes included in the received data node list by performing the replication process using the replication agent, and transmit the data node list including information on the target data nodes and corresponding target zone groups that store the target object and the replicas of the target object to the proxy server. The proxy server may be configured to select the target data nodes by selecting one data node for each one of the selected multiple target zone groups which are selected by the client, transmit the data node list including information on the selected data nodes to the client, and update the metadata database based on the data node list. The proxy server may select one data node for each one of the selected multiple zone groups, as the target data nodes, based on an available storage capacity and an object storage history of data nodes belonging to the target zone groups.

The selection agent may be the proxy server. In this case, the proxy server may be configured to select multiple target zone groups from the plurality of zone groups based on locations of the plurality of zone groups and the client, assign priorities to the selected multiple target zone groups based on distances from the selected multiple target zone groups to the client, select the target data nodes by selecting one data node for each one of the selected multiple target zone groups, update the metadata database based on a data node list including information on the selected data nodes, and transmit the data node list to the client. The client may be configured to receive the data node list from the proxy server, store the target object in one of the target data nodes included in the data node list and store the replicas of the target object in other target data nodes included in the data node list by performing the replication process through the replication agent. The proxy server may use a location-aware server to select the multiple target zone groups from the plurality of zone groups based on locations of the plurality of zone groups and the client and determine the priorities of the selected multiple zone groups based on distances from the selected multiple zone groups to the client.

The replication agent may be a client. In this case, the client may be configured to create the replicas of the target object and transmit the replicas into the other target data nodes.

The replication agent may be the target data node. In this case, the target data node may be configured to receive the target object and store the received target object, determine whether a priority of a corresponding target zone group is a lowest priority, and create a replica of the stored target object and transmit the replica to a target data node of a target zone group having a next highest priority when the priority is not the lowest priority.

The replication agent may be a server. The server may be configured to create the replicas of the target object and transmit the replicas into the other target data nodes. Such a server may be one of the proxy server and a replicator server.

In accordance with embodiments, a method may be provided for distributively storing a target object and replicas of the target object in a plurality of data nodes based on location of the target object and the data nodes. The method may include grouping a plurality of data nodes into a plurality of zone groups based on locations of the plurality of data nodes; selecting multiple target zone groups and selecting target data nodes by selecting one data node for each one of the selected multiple target zone groups through at least one selection agent; storing a target object in one of the selected target data nodes; storing the replicas of the target object in other target data nodes through performing a replication process using a replication agent; and updating a metadata database based on a data node list that includes information on the target zone group and the target data nodes storing the target object and the replicas.

The above-described embodiments of the present invention may also be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A distributed storage system comprising:
non-transitory computer-readable recording media configured to store data in one or more locations;
a plurality of data nodes configured to be grouped into a plurality of zone groups based on locations of the plurality of data nodes and configured to store a target object and replicas of the target object;
at least one selection agent configured to select multiple target zone groups based on locations of the plurality of zone groups and the client in response to an inquiry from a proxy server and select one target data node for each one of the selected multiple target zone groups;

assign priorities to the selected multiple target zone groups and data nodes belonging to the selected multiple target zone groups, wherein the priorities are determined based on user preferences and locations of the zone groups and the data nodes;
a client configured to access the distributed storage system through a network, store the target object in one of the selected target data nodes which has a highest priority among the selected multiple zone groups and perform a replication process using a replication agent to store the replicas of the target object in other target data nodes; and
a metadata database that holds the location information associated with the proxy server is updated based on a data node list that includes information on the target zone groups and the target data nodes storing the target object and the replicas.

2. The distributed storage system of claim 1, wherein:
the at least one selection agent is the client; and
the client is configured to:
select the multiple target zone groups from the plurality of zone groups;
select the target data nodes by selecting one data node for each one of the selected multiple target zone groups based on the assigned priorities;
store the target object in one of the target data nodes;
store the replicas of the target object by performing the replication process using the replication agent; and
transmit the data node list to the proxy server.

3. The distributed storage system of claim 1, wherein:
the at least one selection agent are the client and the proxy server;
the client is configured to:
select the multiple target zone groups from the plurality of zone groups based on locations of the plurality of zone groups in response to an inquiry from the proxy server;
assign priorities to the selected multiple zone groups;
receive a data node list from the proxy server;
store the target object in one of the target data nodes included in the received list;
store the replicas of the target object in other target data nodes included in the received data node list by performing the replication process using the replication agent; and
transmit the data node list including information on the target data nodes and corresponding target zone groups that store the target object and the replicas of the target object to the proxy server, and
the proxy server is configured to:
select the target data nodes by selecting one data node for each one of the selected multiple target zone groups which are selected by the client;
transmit the data node list including information on the selected data nodes to the client; and
update the metadata database based on the data node list.

4. The distributed storage system of claim 3, wherein the proxy server selects one data node for each one of the selected multiple zone groups, as the target data nodes, based on an available storage capacity and an object storage history of data nodes belonging to the target zone groups.

5. The distributed storage system of claim 1, wherein:
the selection agent is the proxy server; and
the proxy server is configured to:
select multiple target zone groups from the plurality of zone groups based on locations of the plurality of zone groups and the client;
assign priorities to the selected multiple target zone groups based on distances from the selected multiple target zone groups to the client;
select the target data nodes by selecting one data node for each one of the selected multiple target zone groups;
update the metadata database based on a data node list including information on the selected data nodes; and
transmit the data node list to the client, and
the client is configured to:
receive the data node list from the proxy server;
store the target object in one of the target data nodes included in the data node list and store the replicas of the target object in other target data nodes included in the data node list by performing the replication process through the replication agent.

6. The distributed storage system of claim 5, wherein the proxy server uses a location-aware server to select the multiple target zone groups from the plurality of zone groups based on locations of the plurality of zone groups and the client and determine the priorities of the selected multiple zone groups based on distances from the selected multiple zone groups to the client.

7. The distributed storage system of claim 1, wherein:
the replication agent is a client; and
the client is configured to create the replicas of the target object and transmit the replicas into the other target data nodes.

8. The distributed storage system of claim 1, wherein:
the replication agent is the target data node; and
the target data node is configured to:
receive the target object and store the received target object;
determine whether a priority of a corresponding target zone group is a lowest priority; and
create a replica of the stored target object and transmit the replica to a target data node of a target zone group having a next highest priority when the priority is not the lowest priority.

9. The distributed storage system of claim 1, wherein:
the replication agent is a server;
the server is configured to create the replicas of the target object and transmit the replicas into the other target data nodes; and
the server is one of the proxy server and a replicator server.

10. A method for distributively storing a target object and replicas of the target object in a plurality of data nodes, the method comprising:
grouping a plurality of data nodes into a plurality of zone groups based on locations of the plurality of data nodes;
selecting multiple target zone groups and selecting target data nodes by selecting one data node for each one of the selected multiple target zone groups through at least one selection agent based on locations of the plurality of zone groups and the client in response to an inquiry from a proxy server;
storing a target object in one of the selected target data nodes;
storing the replicas of the target object in other target data nodes which has a highest priority among the selected multiple zone groups through performing a replication process using a replication agent; and
a metadata database that holds the location information associated with the proxy server is updated based on a data node list that includes information on the target zone group and the target data nodes storing the target object and the replicas.

11. The method of claim 10, wherein:

the at least one selection agent is a client; and the client is configured to:

select the multiple target zone groups from the plurality of zone groups;

select the target data nodes by selecting one data node for each one of the selected multiple target zone groups based on the assigned priorities;

store the target object in one of the target data nodes;

store the replicas of the target object by performing the replication process using the replication agent; and transmit the data node list to the proxy server.

12. The method of claim 11, wherein:

the at least one selection agent are a client and a proxy server;

the client is configured to:

select the multiple target zone groups from the plurality of zone groups based on locations of the plurality of zone groups in response to an inquiry from the proxy server;

assign priorities to the selected multiple zone groups;

receive a data node list from the proxy server;

store the target object in one of the target data nodes included in the received list;

store the replicas of the target object in other target data nodes included in the received data node list by performing the replication process using the replication agent; and transmit the data node list including information on the target data nodes and corresponding target zone groups that store the target object and the replicas of the target object to the proxy server, and the proxy server is configured to:

select the target data nodes by selecting one data node for each one of the selected multiple target zone groups which are selected by the client;

transmit the data node list including information on the selected data nodes to the client; and update the metadata database based on the data node list.

13. The distributed storage system of claim 12, wherein the proxy server selects one data node for each one of the selected multiple zone groups, as the target data nodes, based on an available storage capacity and an object storage history of data nodes.

14. The distributed storage system of claim 10, wherein:

the selection agent is a proxy server; and the proxy server is configured to:

select multiple target zone groups from the plurality of zone groups based on locations of the plurality of zone groups and the client;

assign priorities to the selected multiple target zone groups based on distances from the selected multiple target zone groups to the client;

select the target data nodes by selecting one data node for each one of the selected multiple target zone groups;

update the metadata database based on a data node list including information on the selected data nodes; and transmit the data node list to the client, and the client is configured to:

receive the data node list from the proxy server;

store the target object in one of the target data nodes included in the data node list and store the replicas of the target object in other target data nodes included in the data node list by performing the replication process through the replication agent.

15. The distributed storage system of claim 14, wherein the proxy server uses a location-aware server to select the multiple target zone groups from the plurality of zone groups based on locations of the plurality of zone groups and the client and determine the priorities of the selected multiple zone groups based on distances from the selected multiple zone groups to the client.

16. The distributed storage system of claim 11, wherein:

the replication agent is a client; and the client is configured to create the replicas of the target object and transmit the replicas into the other target data nodes.

17. The distributed storage system of claim 11, wherein:

the replication agent is the target data node; and the target data node is configured to:

receive the target object and store the received target object;

determine whether a priority of a corresponding target zone group is a lowest priority; and create a replica of the stored target object and transmit the replica to a target data node belonging to a target zone group having a next highest priority than the own target zone group when the own target zone group has the lowest priority.

18. The method of claim 10, wherein:

the replication agent is a server;

the server is configured to create the replicas of the target object and transmit the replicas into the other target data nodes; and the server is one of a proxy server and a replicator server.

* * * * *